United States Patent [19]

Hsu et al.

[11] Patent Number: 4,511,216
[45] Date of Patent: Apr. 16, 1985

[54] HIGH POWER LASER DUMP

[75] Inventors: Michael S. Hsu, Lincoln; James P. Hsu, Arlington, both of Mass.

[73] Assignee: The United States of America as represented by the Secretary of the Air Force, Washington, D.C.

[21] Appl. No.: 525,755

[22] Filed: Aug. 23, 1983

[51] Int. Cl.³ .............................................. G02B 5/20
[52] U.S. Cl. ..................................... 350/311; 372/9; 372/34; 372/99; 126/438; 350/625
[58] Field of Search ................ 372/99, 34, 36.9, 98; 126/438, 439; 356/293, 294; 350/311

[56] References Cited

U.S. PATENT DOCUMENTS

| | | | |
|---|---|---|---|
| 3,699,471 | 10/1972 | Mulready et al. | 372/98 |
| 3,792,916 | 2/1974 | Sarna | 350/163 |
| 3,906,510 | 9/1975 | Hattori et al. | 350/311 |
| 3,986,490 | 10/1976 | Chao et al. | 126/270 |
| 4,267,523 | 5/1981 | Brown | 372/34 |
| 4,271,396 | 6/1981 | Brown | 372/99 |

Primary Examiner—William L. Sikes
Assistant Examiner—Léon Scott, Jr.
Attorney, Agent, or Firm—Donald J. Singer; Richard J. Donahue

[57] ABSTRACT

A high power laser dump having defined laser beam introduction angles to the internal surface of a cylinder to maximize energy dispersion and absorption and having two zones formed of distinctive reflective and absorbing materials.

7 Claims, 1 Drawing Figure

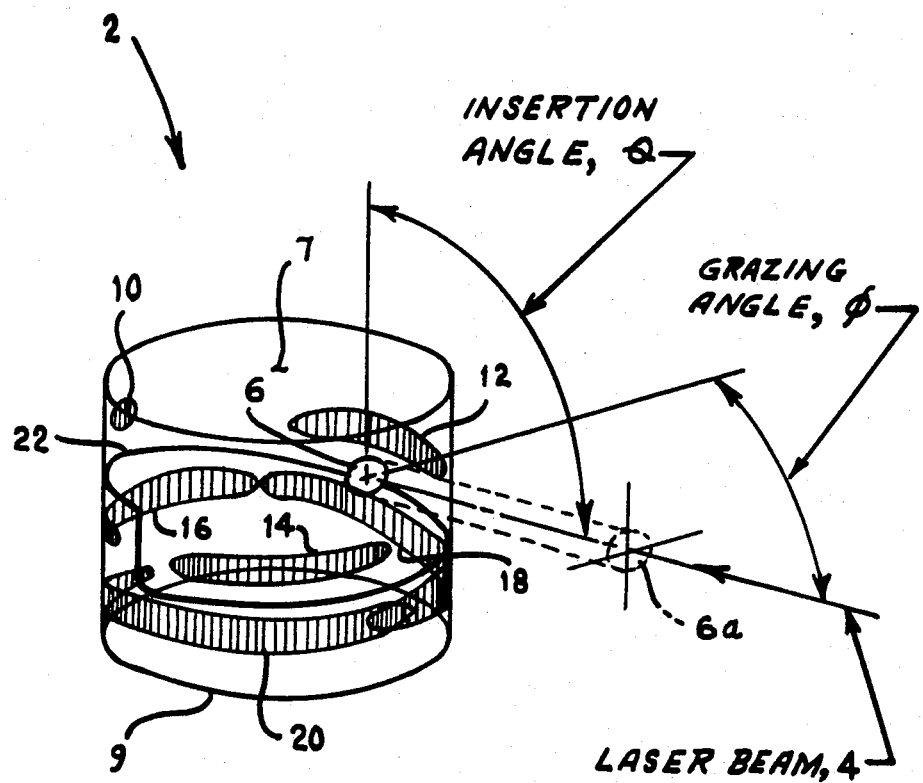

4,511,216

HIGH POWER LASER DUMP

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to an incident radiation absorber and more particularly to an improved high power laser dump.

Laser system applications often require that the laser beam be reshaped. In so doing, some of the rays of the laser beam are separated or stripped from the beam of interest and the energy contained therein must be safely dissipated. In high power laser systems, this energy is substantial and the construction of a suitable heat absorbing device, commonly known as a laser dump, can present formidable problems.

Various geometric configurations of such laser dumps have been proposed and constructed but each have certain undesirable characteristics which limit their effectiveness.

Most existing laser dumps, for example, utilize a liquid coolant to absorb the incident radiant energy to keep the temperature of the dump material within allowable working limits. Liquid cooling requires complex cooling channel networks and associated piping connections for the coolant. To increase the heat transfer rate, the coolant is usually forced through the cooling channels at a very high velocity under great pressure, which necessitates the use of a high pressure pump.

In many high energy laser devices, for example the chemical lasers, the distribution of flux energy in the beam is not uniform. Peak fluxes may be five or more times greater than the average flux. Consequently, at the peak flux spots, the heat input to the laser dump is so high that the coolant may begin to boil. Boiling will cause a decrease in the heat transfer rate, resulting in a rapid increase of the laser dump wall temperature and ultimate material failure.

Some laser dumps, such as those described in U.S. Pat. Nos. 4,267,523 and 4,271,396, both issued to Donald G. Brown on May 12, 1981 and June 2, 1981 respectively, utilize a coolant fluid in conjunction with improved laser dump structure. In U.S. Pat. No. 4,267,523, laser energy is directed to water-cooled panels arranged to form a generally hexagonally-shaped cavity. A laser beam enters the cavity via a longitudinal opening therein and at an acute angle with respect to the plane of the first panel, but normal to the longitudinal axis of the cavity. Thus incident energy is partially absorbed by the first panel and because of the angular relationship between the incoming radiation and the panels, is continuously directed to the other panels until it exits the cavity at a greatly diminished energy level. In U.S. Pat. No. 4,271,396 the absorption cavity is substantially cylindrical in shape such that the incident energy is confined within the cavity. Here again, however, the incident beam is apparently normal to the axis of the cavity and as such, heat absorption is limited to specific longitudinal areas of the cavity. Moreover the absorption material is apparently uniform throughout the cavity.

In another laser dump, that utilizes a cooling fluid, the laser beam is caused to shine into the open end of a hollow cylinder along the longitudinal axis of the cylinder. The beam strikes a somewhat polished, non-perpendicular bottom surface where a small percentage of the energy is absorbed. The remaining energy is then reflected upwardly toward the inner wall of the cylinder. Again, some of the energy is absorbed in the wall of the cylinder and the remainder is reflected upwardly to impinge upon a larger area on the diametrically-opposed surface of the cylinder. This partially absorbing-partially reflecting process continues until the remaining energy shines out of the open top surface of the cylinder. A particular disadvantage of the device described above is that the beam finally does emerge from the cylinder as backscattering and, although greatly reduced in energy level, presents a potential hazard to the environment and personnel therein. Also, the required length of the cylinder to dissipate energy is substantial.

Another form of laser heat dump is manufactured by Schafer Associates of Wakefield, Mass. In this device, laser energy is directed to a pointed reflective surface which reflects the energy to an absorber in the shape of a hemispherical dome. Such a device has an inherent weakness at the apex of the reflector which is subjected to great heat. Furthermore, the volume of such a device is quite large.

SUMMARY OF THE INVENTION

This invention overcomes the problems set forth hereinabove by providing a laser dump of a generally cylindrical construction and having a small opening in the wall thereof for accepting a high energy laser beam therein. The orientation of the laser beam with respect to the cylinder is such that the beam is directed downwardly and offset with respect to the longitudinal axis of the cylinder while deflecting off of the inner wall of the cylinder. The angles of beam introduction are selected such that the footprints of the beam at successive points of incidence increase in area in accordance with a predicted relationship. Furthermore, wall surface coatings of suitable reflectivity are provided in different zones of the cylinder whereby the surface temperature rise of the cylinder is kept within allowable limits for the cylinder material.

It is therefore an object of the present invention to provide a more efficient laser heat dump.

It is a further object of the present invention to provide a laser dump capable of dissipating high levels of energy.

It is yet another object of the present invention to provide a laser dump which is easy to manufacture and of small physical size.

For a better understanding of the present invention, together with other objects thereof, reference is made to the following description taken in conjunction with the accompanying drawing and its scope will be pointed out in the appended claims.

DETAILED DESCRIPTION OF THE DRAWING

The sole FIGURE of the drawing is a pictorial representation of a laser dump constructed in accordance with the teachings of the present invention.

DESCRIPTION OF THE PREFERRED EMBODIMENT

Referring now to the sole FIGURE of the drawing, there is illustrated the interior surface of a hollow cylindrical body forming the laser dump. The cylinder 2 has been given no wall thickness in the drawing so that various constructional and operational features can be depicted in greater detail. A laser beam 4 is caused to shine through an elliptically shaped hole 6 formed through the side of the cylinder. The hole 6 is also shown in projected fashion for purposes of clarity as hole 6a. Support means of conventional construction (not shown) are used to orient the heat dump with respect to the laser beam to provide the angles of beam introduction shown in the drawing and discussed herein. The cylinder 2 also has closed top and bottom surfaces 7 and 9 respectively to prevent a potential hazard to personnel in the surrounding area.

It will be noted that the grazing angle $\phi$ of the laser beam, which is defined herein as the angle between the center ray of the beam and the tangent of the circular cross section of the cylindrical cavity at the point of entry of the beam column, is chosen to be less than 90°. Furthermore, the insertion angle $\theta$, defined herein as the angle between the center ray of the beam and the longitudinal axis of the cylinder is also less than 90°.

The grazing angle $\phi$ and insertion angle $\theta$ are chosen such that a beam coming into the cylinder of diameter D bounces around the interior wall of the cylinder and at the same time descends axially. The number of bounces per round, n, is given by the equations:

$$n = 180/\phi \tag{1}$$

$$n = \pi/\phi \tag{1a}$$

In equation (1) $\phi$ is in degrees, and equation (1a) $\phi$ is in radians.

If chord length C is defined as the horizontal projection of the beam between two adjacent bounces, then:

$$C = D \sin \phi \tag{2}$$

where D is the diameter of the cylinder.

Between two consecutive bounces of the beam, it descends a distance E given by the equation:

$$E = D \sin \phi \cot \theta \tag{3}$$

The areas of the footprints of the beam on the interior surface of the cylinder increase as they descend downward. As a result of successive increases of the areas of the footprints of the beam, the beam flux density decreases. Surface coatings of suitable reflectivity are judiciously applied in different zones of the interior surface of the cylinder. Where the cross-sectional area of the beam is relatively small, the surface is made reflective. Where the beam areas has attained sufficient size with accompanying decrease of radiation flux density, the surface is made absorptive. The surface temperature rise of the dump can thus be maintained within the allowable limits of the dump material. The final result is practically total absorption of the laser energy introduced into the dump. This can be seen in the drawing where the footprints left by the beam as it travels downwardly within the cylinder are depicted. Thus, for example the beam first strikes in the area denoted by the reference numeral 10 where it is partially absorbed. The portion that is not absorbed by the wall of the cylinder is then reflected to the area 12. There it is partially absorbed and the remainder is reflected to the area 14, then to the area 16, the area 18, and lastly to the area 20 where the remainder of the energy is absorbed. The line 22 shown in the drawing denotes the place in the cylinder at which the surface coating material is changed. Thus, the portions of the cylinder in the zone above line 22 are preferably made of a low absorbing and specularly reflective material such as gold, whereas the area below the line 22, is formed of a higher absorption material such as black metal oxides.

The angles of spread at the successive bounces are given by the following expressions:

The angle of spread at the entry and the first bounce:

$$\sigma_1 = \cos^{-1}(\cos\phi - b/D) - \cos^{-1}(\cos\phi + b/D), \tag{4}$$

where b is the diameter of the laser beam.

The angle of spread at the second and successive bounces are given by the following expression:

$$\sigma_n = \cos^{-1}(\cos\phi - b/D) - \cos^{-1}(\cos\phi + b/D) + \tag{5}$$

$$2(n-1)[\sin^{-1}\sqrt{1-(\cos\phi - b/D)^2} - $$

$$\sin^{-1}\sqrt{1-(\cos\phi + b/D)^2}\,]$$

The areas of successive bounces of the circular beam on the inside of the cylinder are:

$$A_n = \pi b D \sigma_n/(8 \sin \theta), \tag{6}$$

where A is the area of the bounce and the subscript n refers to the number of the bounce.

When the incident beam hits the inside surface of the cylinder, a part of it is absorbed and the remaining part is reflected. The absorbed part is converted to heat. Due to the radial spread of the beam at each bounce, the heat flux decreases with each successive bounce. The heat fluxes at successive bounces on a developed inside surface of the cylinder will be referred to herein as the load map. The development of the load map is an important step in the design of the laser dump, because from it the heat fluxes at successive bounces can be calculated, and their distribution patterns can be visualized. The foregoing equations form the basis for developing load maps.

Let $q_o$ and $A_o$ be the original beam flux and cross section area respectively, then the incident power at the first bounce is:

$$Q_{1,in} = q_o A_o \tag{7}$$

The power absorbed at the first bounce, where the absorption coefficient is $\alpha$, is:

$$Q_{1,abs} = \alpha_1 q_o A_o \tag{8}$$

The power relfected at the first bounce, which is also the power incident to the second bounce is:

$$Q_{1,refl} = Q_{2,in} = (1 - \alpha_1) q_o A_o \tag{9}$$

The flux incident at the first bounce is:

$$q_{1,in} = q_o A_o/A_1 \tag{10}$$

The flux abosrbed at the first bounce is:

$$q_{1,abs} = \alpha_1 q_o A_o/A_1 \tag{11}$$

The general formula for the flux absorbed at the nth bounce is:

$$q_{n,abs} = a_n(1-a_{n-1})\ldots(1-a_1)q_oA_o/A_n \quad (12)$$

In one device embodying the present invention, a grazing angle $\phi$ of 45° was selected. In this case the number of bounces per round was four. The diameter of the cylinder D must be such that it can accommodate an aperture, or window, of sufficient size to accept a beam of a given cross section. According to equation (3) the descent of the footprints of the beam on the wall is directly proportional to D for given values of $\phi$ and $\theta$. In order to avoid overlaps of successive footprints of the beam, a reasonable value of D must be chosen. In the aforementioned embodiment, a diameter of 24 inches was selected in view of all of the factors discussed above and provided a unit of reasonable size.

Regarding the insertion angle $\theta$, the descent of the beam between successive bounces of the beam is directly proportional to the cotangent of the insertion angle $\theta$ for fixed values of D and $\phi$; therefore, the smaller values of $\phi$, that is to say, the steeper the beam comes into the cylinder, the greater the descent of the beam is, and the greater are the axial spreads of the footprints of the beams. This is desirable as greater axial spread of the footprints will cause less possibility of overlap. However, this requires a longer cylinder.

In the aforementioned embodiment of the invention, $\theta=80°$ appeared to be a good choice. With this choice of the insertion angle, $\phi=45°$, and D=24 inches, a cylinder 24 inches long gave seven complete bounces with no overlaps. Once the load map of the laser dump has been developed, conventional techniques of heat exchanger or heat sink design may be applied to remove the heat absorbed in the dump so that the dump will remain in the safe range of operating temperatures.

Although the invention has been described with reference to a particular embodiment, it will be understood to those skilled in the art that the invention is capable of a variety of alternative embodiments within the spirit and scope of the appended claims.

What is claimed is:

1. A high power laser dump comprising:
   a metallic body having a cylindrical cavity,
   said cavity having closed top and bottom surfaces,
   said cavity having a specularly reflective coating formed in a first zone thereof and an energy absorbing coating formed in a second zone thereof,
   a hole formed on the side wall of said cylindrical cavity,
   means for directing a laser beam through said hole and into said cavity at a grazing angle of less than 90 degrees,
   said grazing angle being the angle between the center ray of said laser beam and the tangent of the circular cross section of said cylindrical cavity at the point of entry of said laser beam, and
   means for directing said laser beam through said hole into said cavity at an insertion angle of less than 90 degrees,
   said insertion angle being defined as the angle between the center ray of said laser beam and the longitudinal axis of said cylindrical cavity.

2. A high power laser dump as defined in claim 1 wherein:
   said grazing angle is 45 degrees,
   said insertion angle is 80 degrees,
   the diameter of said cylindrical cavity is 24 inches, and
   the axial length of said cylinder is 24 inches.

3. A high power laser dump as defined in claim 1 wherein said metallic body is formed of aluminum.

4. A high power laser heat dump as defined in claim 1 wherein said metallic body is formed of copper.

5. A high power laser heat dump as defined in claim 1 wherein said specularly reflective coating in said first zone of said cavity is formed of gold having an absorptivity factor of 0.02 to 0.1 and said energy absorbing coating in said second zone of said cavity is formed of black metal oxides having an absorptivity factor of 0.8 to 1.0.

6. A high power laser dump as defined in claim 5 wherein said metallic body has a cylindrical shape coaxial with said cylindrical cavity.

7. A high power laser heat dump as defined in claim 6 wherein said top and bottom surfaces of said cylindrical cavity are each perpendicular to the longitudinal axis of said cylindrical cavity.

* * * * *